Dec. 19, 1939.  R. NAFTALI ET AL  2,184,256

TIE STITCHING MACHINE

Filed March 11, 1937  6 Sheets-Sheet 1

INVENTORS
RUDOLF NAFTALI
VALENTINE NAFTALI
BY HENRY NAFTALI

ATTORNEY

Dec. 19, 1939.	R. NAFTALI ET AL	2,184,256
TIE STITCHING MACHINE
Filed March 11, 1937	6 Sheets-Sheet 2

INVENTORS
RUDOLF NAFTALI
VALENTINE NAFTALI
BY HENRY NAFTALI
ATTORNEY

Dec. 19, 1939.    R. NAFTALI ET AL    2,184,256
TIE STITCHING MACHINE
Filed March 11, 1937    6 Sheets-Sheet 3

INVENTORS
RUDOLF NAFTALI
VALENTINE NAFTALI
BY HENRY NAFTALI
ATTORNEY

Dec. 19, 1939.　　　R. NAFTALI ET AL　　　2,184,256
TIE STITCHING MACHINE
Filed March 11, 1937　　　6 Sheets-Sheet 4

INVENTORS
RUDOLF NAFTALI
VALENTINE NAFTALI
HENRY NAFTALI
BY
ATTORNEY

INVENTORS
RUDOLF NAFTALI
VALENTINE NAFTALI
BY HENRY NAFTALI
ATTORNEY

Patented Dec. 19, 1939

2,184,256

UNITED STATES PATENT OFFICE 2,184,256

TIE STITCHING MACHINE

Rudolf Naftali, Valentine Naftali, and Henry Naftali, New York, N. Y., assignors to American Machine & Foundry Company, a corporation of New Jersey Application March 11, 1937, Serial No. 130,252

6 Claims. (Cl. 112—171)

Our invention relates to sewing machines. More particularly, our invention is concerned with improvements to that type of sewing machines employed for stitching neckties, such for example as disclosed in our Patent No. Re. 19,653, dated July 23, 1935, in which there is employed a double pointed needle having its eye located between the points, the opposite ends of which, during the operation of the machine, are alternately grasped by the jaws of a pair of opposed needle bars arranged in alignment.

One object of our invention is to provide a sewing machine of the character described having improved means for automatically stopping the operation of the machine after the complete stitching of each tie, so that the eye of the needle will always be in proper alignment for threading.

Another object of our invention is to provide in a sewing machine of the character described a pair of aligned needle bars of improved construction, whereby opposite ends of the needle which are alternately inserted into the jaws of the needle bars will always be inserted to a constant predetermined depth.

Another object of our invention is to provide in a sewing machine of the character described a needle of improved construction.

Still another object of our invention is to provide a sewing machine of the character described having improved mechanism for operating the tie carrying platform in two directions.

A further object of our invention is to provide a sewing machine of the character described having improved means for synchronizing the action of the passage of the needle from one needle bar to the other.

Other objects of this invention will in part be obvious and in part hereinafter pointed out.

Certain features shown and described but not claimed in this application are shown, described and claimed in our co-pending applications, Serial No. 9,398, filed March 5, 1935; Serial No. 32,148, filed July 19, 1935; Serial No. 36,634, filed August 17, 1935 and our Reissue Patent No. 19,653, dated July 23, 1935.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible embodiments of this invention—

Figure 1:
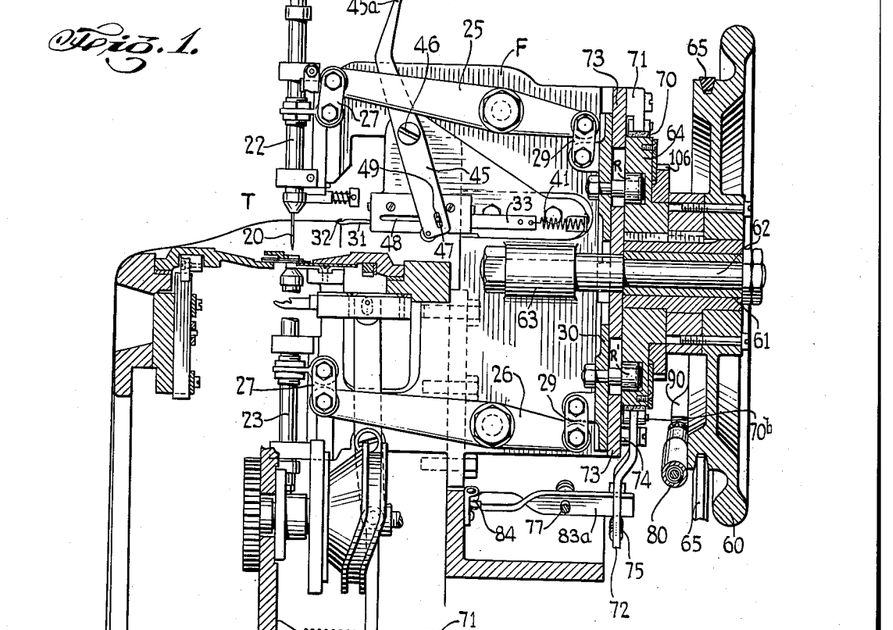
Fig. 1 is a side view of a portion of a tie stitching machine, partly sectional, embodying certain features of our invention.

Referring now in detail to the drawings, we have disclosed an apparatus embodying our invention, such apparatus being of the type disclosed in our Reissue Patent No. 19,653 and co-pending application Serial No. 32,148, filed July 19, 1935. Referring more particularly to Fig. 1 of the drawings, we have disclosed a sewing machine of the class above referred to, in which there is employed a double pointed needle 20 having its eye located between the points, and which is caused to be alternately grasped by upper and lower needle bars 22 and 23, respectively, after piercing the fabrics of a necktie to effectively sew a line of stitching therethrough. A pair of pivotally mounted rocker arms 25 and 26 connected to the needle bars 22 and 23 by links 27, and to a cam actuated plate 30 by means of links 29, cause synchronous oscillation of the said upper and lower needle bars to alternately clutch the needle 20 in the manner described in said Reissue Patent No. 19,653 and co-pending application Serial No. 32,148.

In the operation of sewing machines of the character herein described for stitching neckties, where a separate thread of suitable length is employed for stitching each necktie, it is necessary to rethread the needle after the completion of the stitching of each necktie. Since in actual manufacturing practice a great many neckties are stitched on a single machine in one day, it is highly desirable that the threading of the needle after each tie has been stitched, be accomplished with a minimum expenditure of time and with great accuracy, lest the needle be broken in the threading operation.

By our invention, therefore, we have provided an improved construction of the needle threading mechanism to facilitate quick threading thereof, together with a novel construction designed to automatically insure the proper positioning of the eye of the needle, so that there will be no loss of time caused by manual adjustment of the eye of the needle with respect to the threader. Also, breakage of the needle, due to disalignment thereof with respect to the threader, will be prevented.

Figures 17, 18, 19, 20:
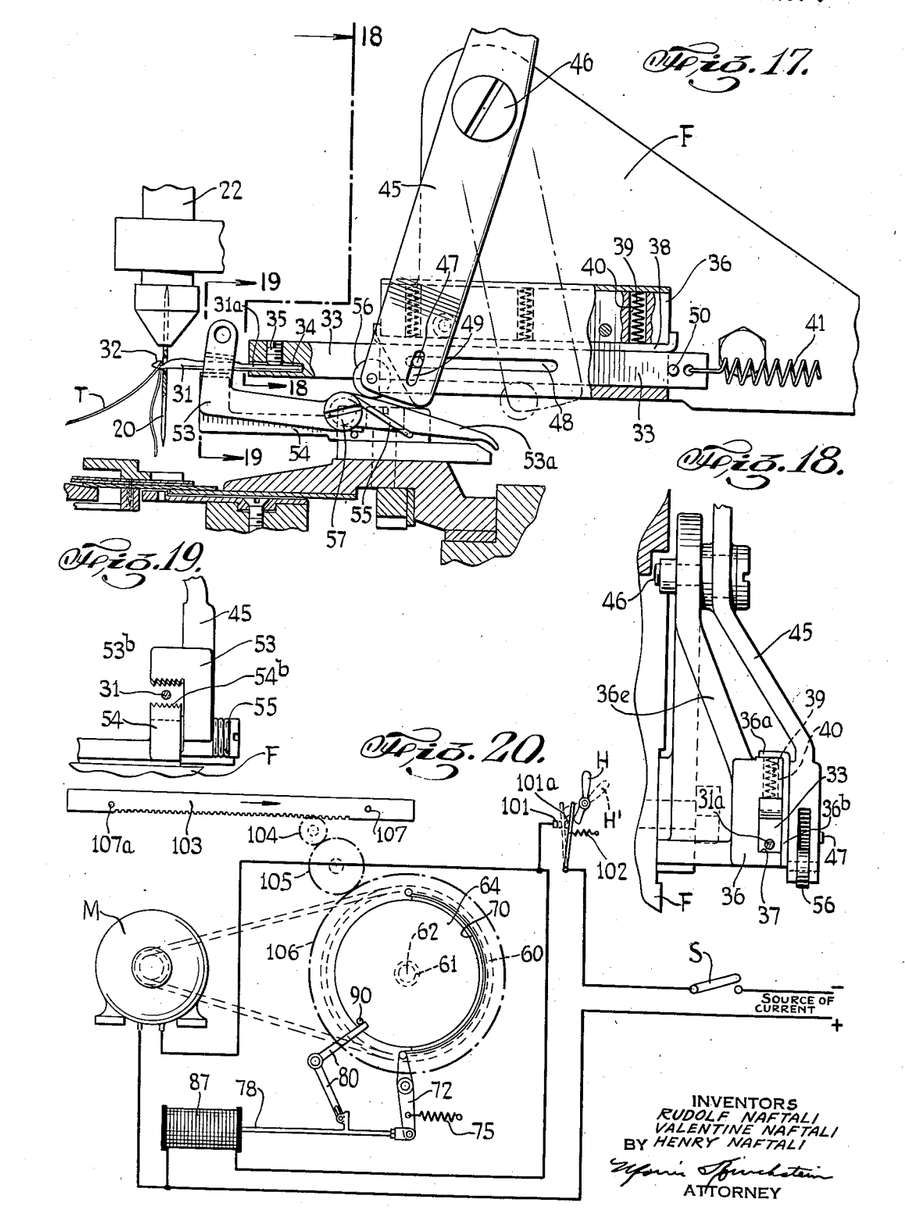
Fig. 17 is an enlarged detail view, partly sectional, of a portion of the threading mechanism illustrated in Fig. 1.
Fig. 18 is a cross-sectional view taken substantially on the line 18—18 of Fig. 17.
Fig. 19 is a cross-sectional view taken substantially on the line 19—19 of Fig. 17.
Fig. 20 is a diagrammatic wiring diagram illustrating the operation of the sewing machine embodying our invention.

For quickly and automatically threading the needle, we have provided the following improved construction, clearly shown in Figs. 1 and 17 of the drawings: A threader 31, having a threading hook 32 at one end thereof is mounted in a longitudinal bar 33 by having a portion 31a adjacent the other end of said threader slidably received in an opening 34 in said bar. The threader 31 may be rigidly held in the opening 34 by means of a set screw 35. It is noted that the threader 31 is disposed in a plane perpendicular to the plane of the longitudinal axis of the needle 20. The bar 33 is slidably mounted in a stationary block 36 and is designed to slidably move in a guideway 37 in a horizontal direction toward and away from the needle 20. The block 36 may be fixed to the frame F of the machine in any suitable manner, or may be integral therewith, if desired. A plate 38 (see Fig. 17) is employed in the guideway 37 and is adapted to frictionally contact the sliding bar 33, said plate being resiliently held in engagement with said bar 33 by means of springs 39 operating in openings 40 in the block 36. One end of each of the said springs 39 is adapted to press against the plate 38, and the other ends of said springs 39 are designed to press against the bent over portion 36a of a plate 36b, forming a front and partial top cover for the block 36. By the above described resilient construction, the sliding bar 33 carrying the threader 31 will automatically adjust itself to variations of alignment, and thus be prevented from sticking.

The threader hook 32 is normally held away from the needle 20, in a position such as shown in Fig. 1, by means of a spring 41 having one end thereof attached to the bar 33 and the other end thereof fixed to a portion of the frame F of the machine.

By our invention we have provided novel means arranged so that when the sewing machine has completed the stitching of a tie and the said machine is thereupon automatically stopped, the eye of the needle will be in proper alignment with respect to the threader 31. The mechanism for automatically causing the machine to stop so that the eye of the needle 20 will be in such proper alignment will be described in detail hereinafter.

To thread the needle in preparation for stitching another tie, the bar 33 is slidably moved toward the needle 20 against the action of the spring 41 until the hook 32 penetrates the eye of the needle. The thread T is then looped over the hook 32 and the bar 33 released, causing the spring 41 to carry the threader hook 32 out of the eye of the needle 20, carrying the thread T with it through said eye. To facilitate the movement of the bar 33, there is provided a lever 45 pivoted to an upwardly extending portion 36a of the block 36 by means of a pivot 46. The upper end of the lever 45 may be provided with a finger grip 45a. The lower end of the lever 45 is operatively connected to the bar 33 by means of a pin 47 on said bar projecting through a longitudinal slot 48 in the front plate portion 36b and operating in a slotted aperture 49 in said lever 45.

A projecting pin 50 suitably positioned on the bar 33 may be employed as a stop means to limit the forward movement of the threader 31 after the hook portion 32 has pierced the eye of the needle 20.

In Figs. 17 and 19 there is shown a device co-operating with the above described needle threading mechanism for automatically grasping and holding one end of the thread T after it has been threaded in the eye of the needle. Such device is similar in function to the device shown in our said co-pending application Serial No. 32,148 and comprises a pair of pivotally interconnected jaw members 53 and 54 supported on the frame F, which are normally held in effective or closed position by a spring 55. The grasping device is so designed that when the threader 31 is moved toward the eye of the needle 20 by pivotally swinging the lever 45 as hereinbefore described, the jaws 53 and 54 will be automatically spread apart against the action of the spring 55 by means of a roller 56 rotatably mounted on the lever 45 at the lower end thereof, and which is adapted to ride upon a cammed surface 53a of the jaw 53 to swing the said jaw on the pivot 57 away from the jaw 54. As a result of the action just described, the threader 31 is permitted to pass freely between the jaws 53 and 54 to pierce the eye of the needle 20 and to return, carrying the thread T back between the open jaws 53 and 54 until the roller 56 has passed off the cammed surface 53a, at which time the jaws 53 and 54 automatically close due to the action of the spring 55 to grasp and hold one end of the thread T. The jaws 53 and 54 may be provided with toothed surfaces 53b and 54b to more firmly grip the thread T. After the complete stitching of a tie, the held thread is automatically released in a manner described in our co-pending application Serial No. 32,148.

From the above described operation of the needle threader, it is apparent that since the threader operates in a substantially fixed horizontal plane, it is highly desirable, when the sewing machine is automatically stopped after the complete stitching of a tie, that the eye of the needle be in proper alignment to be pierced by the hook 32 of the threader 31, otherwise the said needle 20 is likely to be broken. We have, therefore, provided the following improved means for causing the eye of the needle 20 to be always in proper alignment with the threader 31 whenever the machine is automatically stopped.

Referring particularly to Figs. 1 to 4 and 20, there is shown a fly wheel 60 fixed to a collar 61 for rotation therewith, said collar 61 being freely rotatably mounted on a fixed shaft 62 held in a bracket 63 fixed to the frame F of the sewing machine, in the manner shown and described in our said co-pending application Serial No. 32,148. Also mounted on the collar 61 for rotation therewith is an annular cam 64, designed to actuate the rocker arms 25 and 26, as described in our said co-pending application. Suitable means are provided for driving said wheel 60 and cam 64, such as for example, a belt 65 connected to a motor pulley which is driven by a motor, not here shown, but which is shown in our said co-pending application.

By our invention we have devised a construction whereby when the current is turned on from a source of supply, the means for operating the machine is held normally ineffective until a hand switch is thrown, which automatically renders the machine operating means effective for a predetermined period of time, such as for example, the complete stitching of a tie, after which the said hand switch is automatically opened to break the circuit to again render the machine operating means ineffective. We have provided means for causing the machine to be stopped as above described, so that the eye of the needle will be in proper alignment for threading. The mechanism for carrying out the above will now be described.

Mounted on the outer rim of the cam 64 is a flat brake band 70 adapted to be normally held in functional engagement with a portion 64a of the said cam rim by having one end 70a of said band pivotally attached to a suitably positioned fixed support 71 and the other end 70b of said band being pivotally attached to a rocker arm 72. The rocker arm 72 is pivotally mounted on a wall 73 of the frame F by means of a fixed pivot 74, and is designed to normally hold the band 70 in frictional engagement with the annular cam 64 to prevent rotation thereof, by means of a spring 75 having one end thereof attached to the free end of the rocker arm, and the other end thereof being fixed to a pin 76 on the wall 73.

Figure 2:
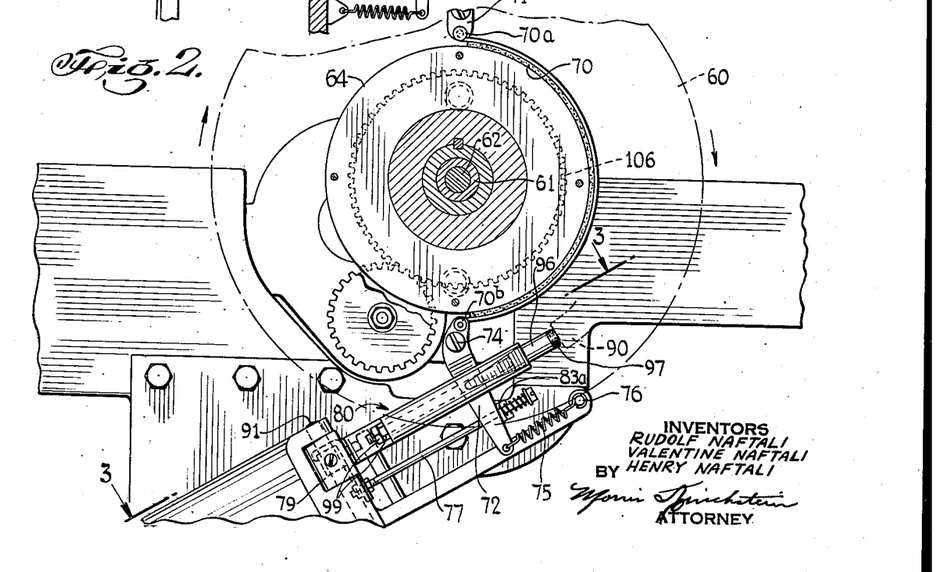
Fig. 2 is an end view, partly sectional, of a portion of the apparatus shown in Fig. 1, illustrating our novel means for automatically stopping the operation of the machine after the stitching of a tie.
Figures 3, 4:
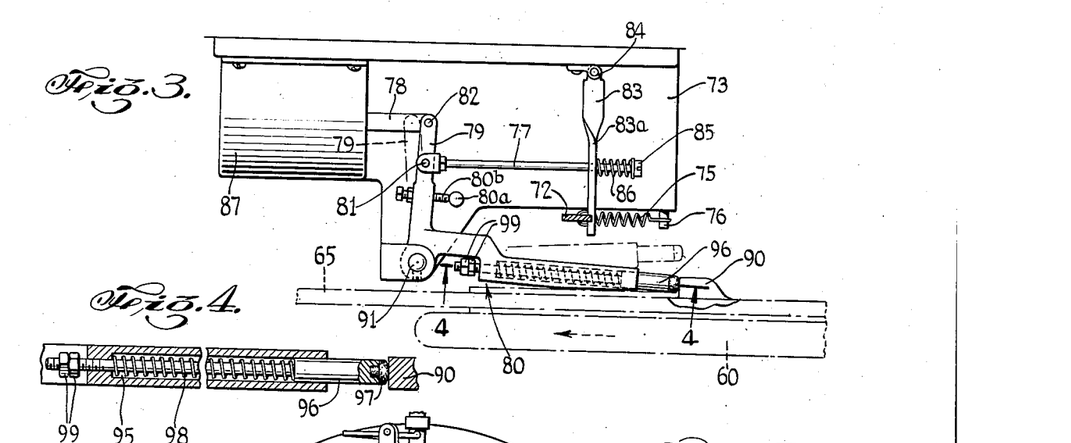
Fig. 3 is a cross-sectional view taken substantially on the line 3—3 of Fig. 2.
Fig. 4 is an enlarged cross-sectional view taken substantially on the line 4—4 of Fig. 3.
Figure 5:
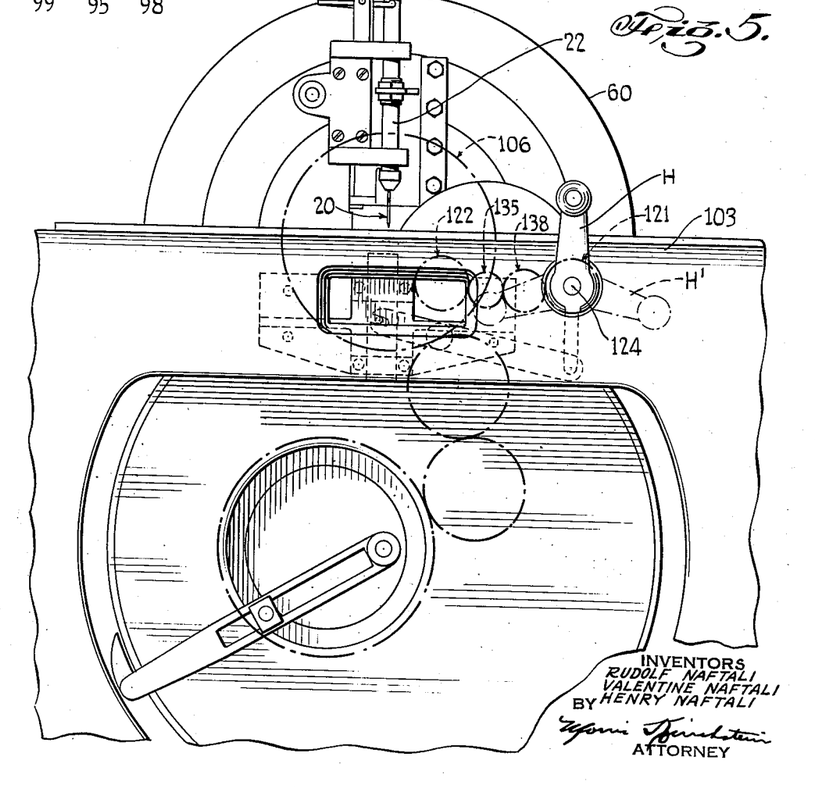
Fig. 5 is a front elevational view of a portion of the apparatus shown in Fig. 1.

To render the brake band 70 ineffective against the action of the spring 75, there is provided a rod 77 attached at one end to an armature 78 by means of a link 79 (see Fig. 3), forming a part of a pivotally mounted member 80, soon to be described. The rod 77 is pivoted to the link 79 at 81, while the link 79 is in turn pivotally connected to the armature 78 at 82. The other end of the rod 77 is adapted to pass through an aperture in a member 83 pivoted to the wall 73 at 84, said member having an extended portion 83a which is adapted to contact the rocker arm 72. The rod 77 is provided with an enlarged head 85 adapted to hold a spring 86 in confinement between said head 85 and the portion 83a. The spring 86 is designed to slightly offset the action of the spring 75 and at the same time to prevent too rapid action of the brake band 70. For releasing the brake band from its effective position, as shown in Fig. 2 of the drawings, there is provided a solenoid 87, mounted on the wall 73 and which when energized by closing a hand switch, in a manner to be more fully described, will attract its armature 78 to carry with it the rod 77 which, in turn, acts upon the rocker arm 72 to swing said rocker arm about the pivot 74 against the action of the spring 75. The brake band 70 is thus released to permit rotation of the cam 64 which, in turn, causes synchronous oscillation of the needle bars 22 and 23, as described.

When, after the complete stitching of a tie, the solenoid 87 becomes (automatically by the opening of the hand switch) deenergized, the spring 75 will restore the rocker arm 72 to its normal position, such as shown in Fig. 2, to effectively cause the band 70 to frictionally engage the cam 64. To insure that the upper needle bar 22 will receive the needle 20 and that the said needle bar 22 will stop in a position whereby the eye of the needle will be in proper alignment with the threader 31, there is provided on the inner flat surface of the wheel 60 a lug 90 which is adapted to abut against a specially designed abutment member 80, normally disposed in the path of movement of said lug 90, as clearly shown in Figs. 2 and 3. The member 80 is pivoted to the wall 73 at 91, and is integral with the link 79, which in turn is pivotally connected to the armature 78, as above described.

When the abutment member 80 is in the normal position as shown, it serves as an aid to the frictional action of the band 70 to prevent rotation of the cam 64. However, when the solenoid 87 is energized to attract its armature 78, it is seen that at the same time that the brake band 70 is released, as hereinbefore described, the abutment member 80 will be swung out of the path of the lug 90 to permit rotation of the wheel 60 and cam 64.

The tension of the brake band 70 is such that when the solenoid 87 is deenergized to automatically cause braking action of the band 70, the cam 64 will still slidably rotate at a very low speed until the lug 90 on the wheel 60 strikes the abutment member 80 to cause the sewing machine to come to a dead stop. The lug 90 is so disposed that when the machine is thus caused to stop, as above described, the eye of the needle will be in proper alignment to be pierced by the hook 32. To minimize the shock of the meeting of the abutment member 80 with the lug 90, the said member 80 is provided with a longitudinal opening 95 (see Fig. 4) in the end thereof, into which there is slidably received a rod 96 having a rounded end portion 97, which is adapted to strike the lug 90 and which may be constructed of suitable resilient material. A spring 98 housed within the opening 95 is adapted to resiliently resist the inward sliding movement of the rod 96 and thus absorb the shock when the end 97 strikes the lug 91. A pair of nuts 99 threaded on a reduced portion 100 of rod 96 and disposed as shown is attached to the rod portion 96 and serves as a means for adjusting the tension of the spring 98.

To limit the pivotal movement of the abutment member 80 toward the path of the revolution of the lug 90, we have provided a stop member 80a on the wall 73 (see Fig. 3) designed to cooperate with an adjustable set screw 80b on the link 79.

In Fig. 20 of the drawings, we have shown a wiring diagram illustrating the automatic action of the starting and stopping mechanism above described, and in which a switch S controlling current from a source of supply is shown in open position to break the circuit of current from said source of supply. When the switch S is closed to complete the circuit from the source of supply, the motor M for driving the wheel 60 and cam 64 is not yet energized due to the open hand switch H, which separates the contacts 101 and 101a due to the action of the spring 102, and thus renders the circuit to the motor M ineffective. The brake band 70 is, therefore, held in frictional engagement with the cam 64, due to the action of the spring 75, and because of the abutment member 80, which is shown diagrammatically as disposed in the path of the lug 90. Also, there is shown the traveling work platform 103, adapted to be driven through a chain of gears 104, 105 and 106, the said gear 106 being mounted on the same collar 61 as the cam 64 and wheel 60.

When it is desired to operate the machine for stitching a tie, the hand switch H is moved to the dotted line position H', which closes the contacts 101 and 101a against the action of the spring 102, to complete the circuit through the solenoid 87 to energize the same, which then attracts its armature 78 and releases the brake band 70 against the action of the spring 75 in the manner hereinbefore described. At the same time, the abutment member 80 is swung out of the path of the lug 90. The motor M, having been also simultaneously set in operation by the closing of the switch H, drives the wheel 60 and cam 64 through the belt 65 to oscillate the needle bars 22 and 23. The traveling work platform 103 is also simultaneously caused to travel by means of the gears 106, 105 and 104, in the direction of the arrow, and the machine proceeds in its operation of stitching a tie.

After the work platform, carrying the assembled tie fabrics, has traveled a distance sufficient to complete the stitching of a tie, the pin 107 will strike the contact arm 101a to automatically open the contacts 101 and 101a moving the switch H against the action of the spring 102. When contacts 101 and 101a have been opened the circuit from the source of current supply to the motor M is immediately broken, and the solenoid 87 simultaneously becomes deenergized, to cause braking action of the band 70 on the cam 64, and the pivotal swinging of the abutment member 80 directly in the path of the lug 90. The wheel 60 and cam 64 will rotate slowly due to the frictional action of the brake band 70 until the lug 90 strikes the member 80, to bring the machine to a dead stop. The mechanism of our invention is so designed that when the above described stopping action of the machine occurs, the eye of the needle 20 will be in registered alignment with the threader hook 32. For causing the work platform 103 to automatically break the circuit through the source of supply when operated in the reverse direction, by means of our invention which will soon be described, a second pin 107a similar to the pin 107 is provided at the other end of the platform 103.

In the stitching machines of the character described, the work traveling platform was heretofore designed to travel in one direction only, while the stitching operation took place. After the complete stitching of each tie, it was, therefore, necessary to manually slide the platform back to its original starting point in readiness for the stitching of a second tie.

By our invention, we have devised an improved mechanism, clearly shown in Figs. 5, 6, 7, 10 and 11, and described below, whereby the traveling work platform may be caused to travel, first in one direction to completely stitch a tie, at which point the said tie may be removed and replaced by a prepared assembly of tie fabrics for a second tie, after which the work platform will be caused to travel in an opposite direction to complete the stitching of said second tie and so on, alternating in direction for each tie, thus effecting a great saving of time.

The work platform 103 is provided with a gear rack 120 on the underside thereof, and is adapted to travel along any suitable guide means or tracks such as shown and described in our Reissue Patent No. 19,653, and to be driven from the motor M by a gear designed to mesh with the gear rack 120, through suitable intermediate mechanism designed to intermittently advance the platform in the manner shown and described in our said Reissue Patent No. 19,653 and our said co-pending application Ser. No. 32,148.

Instead of one gear formerly employed for meshing with the gear rack on the platform to cause said platform to travel in one direction, we have provided a pair of gears 121 and 122, mounted for rotation on the shafts 123 and 124 respectively, the gear 122 being adapted to mesh directly with the main driving gear 135 on the shaft 136 journaled in the bearing 137 fixed to the machine, while the gear 121 is adapted to mesh with an intermediate gear 138 rotatably mounted on a fixed shaft 139, said gear 138 being in mesh with the main driving gear 135.

The shaft 123 is fixed to the machine by means of a screw threaded shaft 123a, while the shaft 124 which extends to the forward edge of the machine M is journaled in a bearing 125 and is provided with a handle H at the outer end thereof to facilitate the rotation thereof. The opposite end of the shaft 124 is rotatably and slidably received in a bushing 126, which in turn is slidably mounted in an opening 127 in a portion of the machine. Fixed to the shaft 124 is a projecting pin 128 operating in a cam slot 129 in the slidable bushing 126 carrying the gear 121. From the above described construction, it is seen that when the shaft 124 is turned in a counter-clockwise direction, with respect to Fig. 10, the pin 128 operating in the slot 129 will cause the bushing 126 to slidably move inwardly, and when turned in a clockwise direction the bushing 126 will slidably move in the opposite direction.

Slidably but non-rotatably attached to the shaft 124, at a point spaced from the bushing 126, is a bushing 130 provided with a cammed slot 131 designed to operatively receive therein a projecting pin 132. The bushing 130 is provided with an arm 130a, the free end of which is received in a groove 140 on an extension 122a of the gear 122. In operation, the shaft 136 carrying the gear 135 is driven by the motor M through an intermediate chain of gearing. The gear 135 being always in mesh with the idler gear 138, drives the same.

Figure 6:
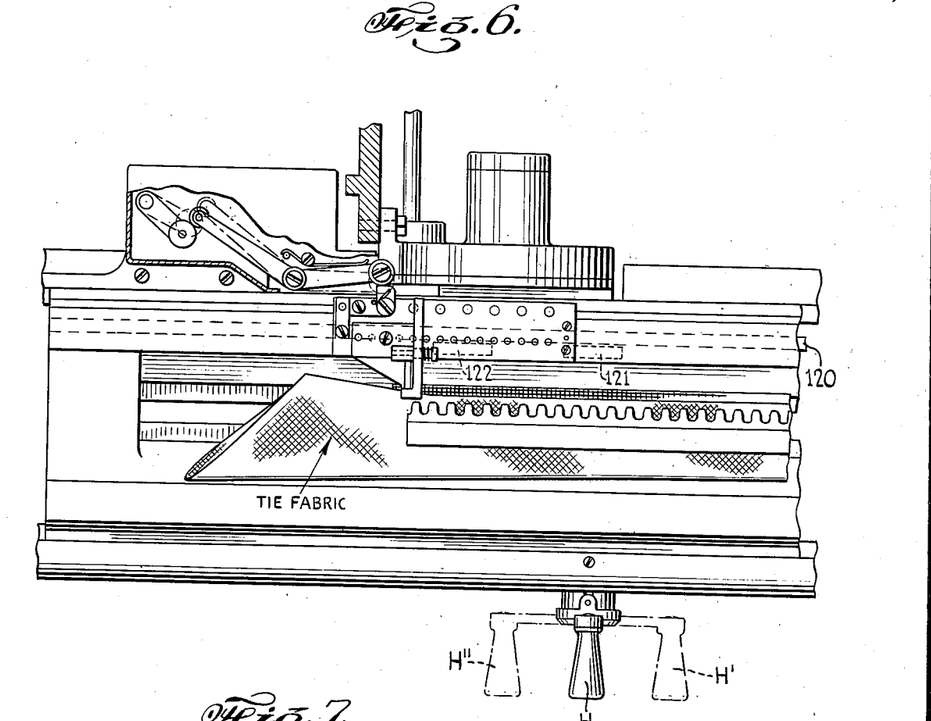
Fig. 6 is a plan view of a portion of the apparatus shown in Fig. 1.
Figure 7:
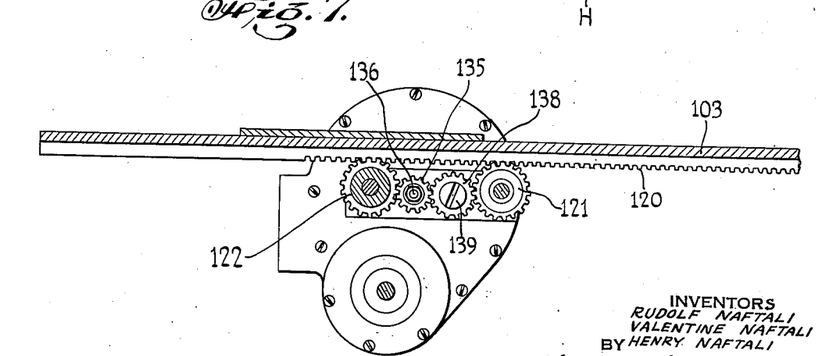
Fig. 7 is a detail view, partly sectional, of a portion of the apparatus shown in Figs. 5, 10 and 11, illustrating the arrangement of gearing for operating the work platform in two directions.

By our construction as above described, when the handle H is in the full line position shown in Fig. 6, both of the gears 121 and 122 are out of mesh with the gear rack 120. This is the neutral position. When it is desired to cause the platform 120 to travel in one direction, it is merely necessary to turn the shaft 124 in a clockwise direction with reference to Fig. 10, by means of the handle H, and the pin 132 operating in the cammed slot 131 will cause the bushing 130 to slidably move inwardly, causing the arm 130a thereof to slidably move the gear 122 into mesh with the rack 120 while the gear 121 remains in its original neutral position, thus causing the platform to move in the direction of rotation of the gear 122. After the platform 120 has traveled a distance sufficient for the complete stitching of a tie, the handle H is then turned in a counter-clockwise direction past the neutral position, to cause the bushing to be slidably moved outwardly to slide the gear 122 out of mesh with the rack 120 and at the same time the pin 128 operating in the cammed slot 129 will cause the bushing 126 to slidably move the gear 121 into mesh with the rack 120, to cause the platform 103 to travel in the direction of rotation of the gear 121, which it is noted rotates in a direction opposite to that of gear 122.

The mechanism may be so designed that when the handle H is turned out of its neutral position to either of the dotted line positions H' and H" shown in Fig. 6, such action will close a circuit to energize the motor M and the solenoid 87, as hereinbefore described.

In sewing machines of the character described, in which upper and lower needle bars are employed for alternately clutching a double pointed needle, it is highly desirable that the needle be received in the needle bar at a constant depth for firm gripping, also, it is important to properly insert the needle to such constant depth so that the eye thereof will be in alignment with a threading device of the type outlined above.

In the type of needle bar construction heretofore employed, such as for example that shown and described in our said co-pending application Serial No. 32,148, it has been found that due to variations in the tension of the spring designed to press against the shank for holding the needle gripped by a plurality of balls, the needle did not always alternately enter the needle bars at a constant depth, with the result that the threader would not be in proper alignment with the eye of the needle.

By the present invention, we have accordingly provided an improved needle bar construction to insure the constant alignment of the needle eye and threader in conjunction with our previously described stopping mechanism.

In Figs. 12 to 15, we have shown our improved type of needle bar construction for the upper and lower needle bars 22 and 23, similar in construction to that shown and described in our said co-pending application Serial No. 32,148, and comprising a tapered chuck 150 screwed to the upper needle bar 22, and a chuck 151 screwed to the lower needle bar 23. Within the hollow interior of the chucks 150 and 151 a plurality of balls B (see Fig. 15) are provided. When the balls B are pressed toward the apex of the chucks 150 and 151 by means of a spring pressed shank 152, they are forced together to grip the needle 20 in the manner described in said co-pending application. In order that the depth of the insertion of the needle 20 into the needle bars shall be independent of the action of the spring 153 which presses the shank 152, we have provided a transversely disposed plate 155 in each of the needle bars 22 and 23, rigidly fixed to the inner wall of the needle bar casing 156 so as to be unaffected by variations in the tension of the springs 153. The fixed plates 155 are each provided with a centrally disposed suitably sized opening 157 designed to frictionally receive the tapered points of needle 20 therein, said openings 157 being smaller than the needle width to definitely limit the distance of insertion.

Due to the fact that the needle 20 is adapted to be alternately clutched by the needle bars 22 and 23 and is provided with an eye 160 centrally located between the points, it has been found that the type of needles formerly employed at times tended to rotate axially during the path of travel from one needle bar, through the material to be stitched and to the other needle bar, or while being held in one of the needle bars. The effect of this has been to axially disalign the eye of the needle with respect to the threading mechanism, with resulting disadvantages hereinbefore mentioned.

Figures 13, 14, 15, 16:
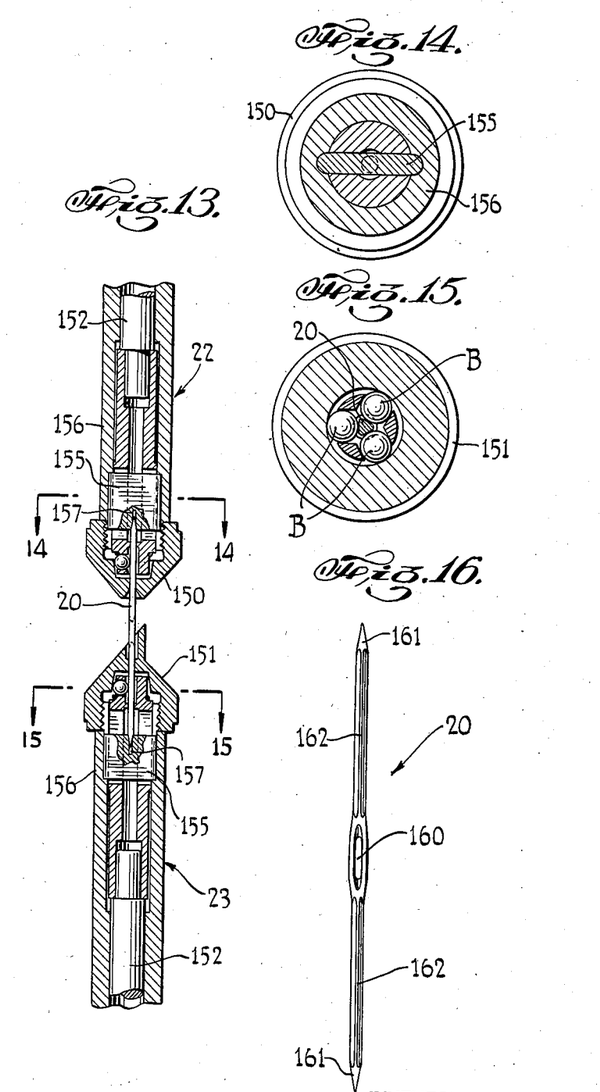
Fig. 13 is an enlarged longitudinal sectional view of a portion of the needle bars shown in Fig. 12.
Fig. 14 is an enlarged cross-sectional view taken substantially on the line 14—14 of Fig. 13.
Fig. 15 is an enlarged cross-sectional view taken substantially on the line 15—15 of Fig. 13.
Fig. 16 is an enlarged view of our improved needle construction.

We have, therefore, devised a needle construction 20 in which the portions 162 thereof between the eye 160 and the points 161 are of non-circular cross section, preferably triangular in cross-sectional contour, as shown in Fig. 16. It is thus seen that with a needle of triangular cross section, or any other suitable non-circular cross section, the balls B will more effectively grasp the said needle, which will also be prevented from axial rotation.

In the operation of tie stitching machines of the type constructed in accordance with our Reissue Patent No. 19,653 and our co-pending application Serial No. 32,148, the synchronization of the upper and lower needle bars has been such that the needle bar after clutching the needle is caused to proceed toward the fabric to push the needle through the said fabric, and just as it is about to start back the said needle bar lets go of the needle, which is simultaneously grasped and pulled clear of the other side of the fabric by the second needle bar.

We have found that in the above described operation, in which the needle is either pushed or pulled through the fabrics by the action of only one needle bar at a time, difficulty is apt to be experienced when closely woven fabrics or heavy fabrics are employed, because the travel of the needle through the fabric would be slowed up and thus cause a lag in the perfectly timed synchronism of the alternate clutching of the needle by the needle bars.

By our invention, we have devised mechanism designed to obviate the above described difficulty, by causing the needle during a predetermined interval of its travel through the fabric to be pushed by one needle bar and to be simultaneously pulled by the other needle bar, thus causing the needle to uniformly pierce all types of fabrics.

Figures 8, 9, 10, 11:
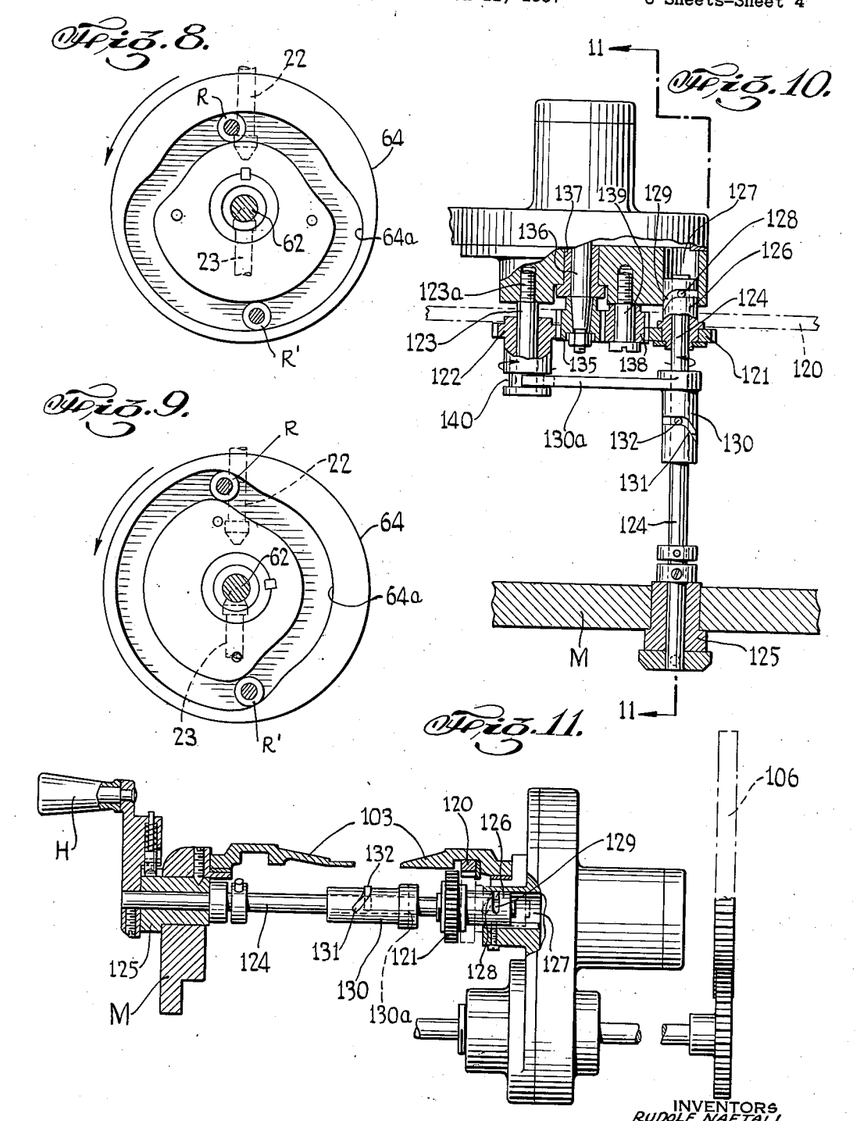
Figs. 8 and 9 are diagrammatic views illustrating our improved cam construction for the improved synchronous operation of the upper and lower needle bars with respect to the needle.
Fig. 10 is a plan view, partly sectional, of the gearing mechanism shown in Figs. 5 and 7.
Fig. 11 is a cross-sectional view taken substantially on the line 11—11 of Fig. 10.
Figure 12:
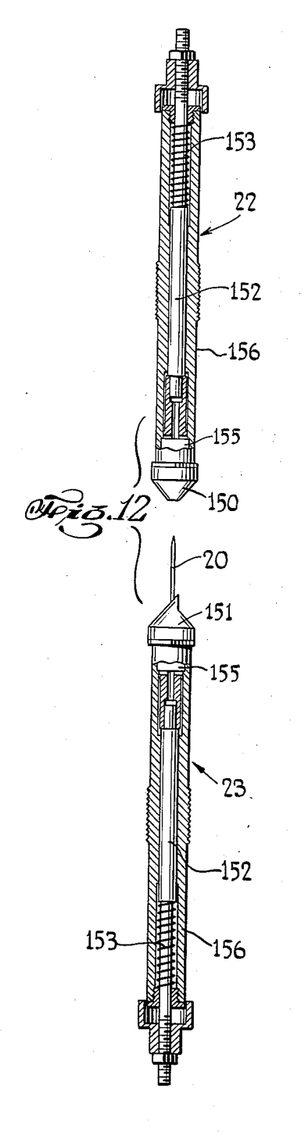
Fig. 12 is an enlarged detail view, partly sectional, of the upper and lower needle bars, shown in Fig. 1.

Referring to Figs. 8 and 9, there is illustrated the improved construction of the annular cam 64, having a specially designed cam groove 64a, in which the rollers R and R' operate, to cause movement of the rocker arms 25 and 26, which in turn cause synchronous oscillation of the upper and lower needle bars 22 and 23 respectively. In Fig. 8, we have illustrated diagrammatically the position of the needle bars with respect to the groove 64a and the rollers R and R', wherein it is shown that the upper needle bar 22 is about to travel downwardly due to the upward travel of the roller R while the lower needle bar 23 remains stationary. Upon rotation of the cam 64 in the direction of the arrow for a distance of 270 degrees, as shown in Fig. 9, it is seen that the lower needle bar 23 has still a slight distance to move toward the fabric while the needle bar 22 has started to move away from the fabric. In other words, for the space of time when the needle is piercing the fabrics, the upper and lower needle bars are both clutching the needle at the same time and are moving in the same direction, one pulling and the other pushing.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In a sewing machine for stitching the assembled fabrics of a tie, the combination of upper and lower needle bars, a needle, means for causing the needle to be alternately connected to each needle bar after the said needle has pierced the tie fabrics, said last named means comprising a cam, said cam being designed to cause the needle to be connected to said upper and lower needle bars at the same time for only a predetermined period of operation to cause a pushing action on the needle by one needle bar and a simultaneous pulling action on the needle by the other needle bar, during the interval when the needle is piercing the fabrics.

2. In a sewing machine of the character described, in combination a needle having a tapered point and an eye spaced therefrom, a needle threading device mounted on said machine, a needle bar, said needle bar comprising spring actuated means for automatically clutching and unclutching a needle, a hollow casing having an annular wall, a rigid plate in said casing and fixed at the opposite ends thereof to said wall for integral movement therewith and an opening in said plate adapted to protectively receive the tapered point of said needle therein at a constant predetermined depth with respect to said needle eye and said threading device, said plate being independent of the clutching and unclutching means and so arranged as to be unaffected by variations in the tension of said spring.

3. In a sewing machine, a needle, a needle bar comprising a hollow casing and a hollow chuck attached thereto, a plurality of balls housed in said chuck, a spring pressed shank adapted to press the balls toward the apex of said chuck so as to force them together to grip said needle, a transversely disposed plate fixed to the inner wall of said needle bar casing, said plate being provided with a centrally disposed opening smaller than the width of said needle to definitely limit the distance of insertion thereof, said plate being so mounted as to be unaffected by variations in the tension of said spring.

4. In a sewing machine of the character described, in combination, a double pointed needle having an eye located between the points, a fixedly mounted needle threading device, a needle bar, means for inserting said needle in said needle bar, said needle bar comprising means for automatically clutching and unclutching said needle and rigid stop means carried by said needle bar for protectively limiting the insertion of said needle into said needle bar to a predetermined constant depth, said predetermined depth being such that the eye of the needle will be in alignment for effective cooperation with said needle threading device, said last named means being unaffected by the action of said clutching and unclutching means.

5. In a sewing machine of the character described, in combination, a double pointed needle having an eye located between the points, a fixedly mounted needle threading device, a needle bar, means for inserting said needle in said needle bar, said needle bar comprising means for automatically clutching and unclutching said needle and rigid stop means carried by said needle bar for protectively limiting the insertion of said needle into said needle bar to a predetermined constant depth, said predetermined depth being such that the eye of the needle will be in alignment for effective cooperation with said needle threading device, said last named means comprising a member rigidly attached to the wall of said needle bar for integral movement therewith, said rigidly attached member being unaffected by the action of said clutching and unclutching means.

6. In a sewing machine of the character described, in combination, a double pointed needle having an eye located between the points, a fixedly mounted needle threading device, a needle bar, said needle bar comprising a hollow casing having an annular wall, means for automatically clutching and unclutching said needle, means for causing the needle to become inserted in said needle bar to a predetermined constant depth, said predetermined depth being such that the eye of the needle will be in alignment for effective cooperation with said needle threading device, said last named means comprising a rigid plate in said casing and fixed to said wall for integral movement therewith and an opening in said plate adapted to protectively receive the tapered point of the needle therein, said rigid plate being unaffected by the action of said clutching and unclutching means.

RUDOLF NAFTALI.
VALENTINE NAFTALI.
HENRY NAFTALI.